Dec. 25, 1962 M. C. BURK 3,069,895

CHROMATOGRAPHIC ANALYZER PEAK READER

Filed April 10, 1958 6 Sheets-Sheet 1

INVENTOR.
M.C. BURK

BY Hudson & Young
ATTORNEYS

Dec. 25, 1962 M. C. BURK 3,069,895
CHROMATOGRAPHIC ANALYZER PEAK READER
Filed April 10, 1958 6 Sheets-Sheet 2

3 B

INVENTOR.
M. C. BURK
BY
Hudson & Young
ATTORNEYS

Dec. 25, 1962 M. C. BURK 3,069,895

CHROMATOGRAPHIC ANALYZER PEAK READER

Filed April 10, 1958 6 Sheets-Sheet 3

INVENTOR.
M. C. BURK

BY Hudson & Young

ATTORNEYS

Dec. 25, 1962 M. C. BURK 3,069,895

CHROMATOGRAPHIC ANALYZER PEAK READER

Filed April 10, 1958 6 Sheets-Sheet 4

INVENTOR.
M. C. BURK

BY Hudson & Young

ATTORNEYS

Dec. 25, 1962 M. C. BURK 3,069,895

CHROMATOGRAPHIC ANALYZER PEAK READER

Filed April 10, 1958 6 Sheets-Sheet 5

INVENTOR.
M.C. BURK

BY Hudson & Young

ATTORNEYS

INVENTOR.
M. C. BURK

BY

Hudson & Young
ATTORNEYS

United States Patent Office 3,069,895
Patented Dec. 25, 1962

3,069,895
CHROMATOGRAPHIC ANALYZER PEAK READER

Marvin C. Burk, Bartlesville, Okla., assignor to Phillips Petroleum Company, a corporation of Delaware Filed Apr. 10, 1958, Ser. No. 727,606
24 Claims. (Cl. 73—23)

This invention relates to a method and apparatus for recording only the maximum values of a selected component of a sample stream that is passed through an analyzer. In one specific aspect it relates to such method and apparatus suitable for rendering a gas phase chromatographic analyzer suitable for control purposes.

In vapor phase chromatography a measured sample is placed in a packed column. This sample is then eluted by passing a carrier gas such as helium through the column. The various gases that make up the sample will be eluted from the column by the carrier gas in a fixed order. When the packed column is associated with suitable measuring apparatus, such as a recorder, a series of curves will be generated by measuring the eluted gas stream. These curves will consist of a series of peaks with each peak indicating a certain component (or in certain cases, two components), of the measured sample. The height of each peak indicates the concentration of the component which the peak represents. This technique means that the entire sample must be analyzed in order to determine the amount of one component therein, that is to say, all of the vaporizable substances in the measured sample must be eluted from the column in order to properly analyze the sample. By appropriately selecting packing, it is possible to elute more than one gas at a time. In the following discussion it will be assumed, for the sake of clarity, that only one gas is being eluted.

It has been proposed to use such a chromatographic analyzer to control processes, especially fractionation processes. The advantage of such use, compared with other means for analyzing, is that the chromatgographic analyzer can accurately determine the concentrations of certain materials in the presence of other materials, e.g. isopentane in the presence of normal and isobutanes, and propane.

If one is interested in such control, it is ordinarily desired to arrange for control from the measurement of a single component. In the case of the aforesaid series of peaks, it becomes necessary to select the one peak that indicates the concentration of the control component and to produce a signal therefrom that is representive of the maximum peak height, i.e., that is representative of the concentration determined. The peak reader of the instant invention permits doing this, selecting a single component and producing a control signal therefrom.

In the instant invention, means, such as a timer, are provided to select a component or a peak during elution. The same means also times the admission of a measured sample and a carrier gas, in sequence, into a chromatographic column. When the selected component is eluted a signal is generated and is passed to a signal storing means, such as a capacitor. When the maximum point of the peak occurs, the signal storing means provides a continuous signal to a comparing and balancing device which in turn operates a reversible motor to adjust a potentiometer. The comparing device compares the stored signal with that from the potentiometer.

The potentiometer receives its power from a separate source and when the potentiometer has been adjusted so that its signal equals the stored signal, the peak has been read. The potentiometer signal is transmitted to a recorder-controller which can then adjust a process variable as needed.

Some time after the peak has been read the timer then discharges the capacitor and otherwise prepares the system to read another peak. The potentiometer, not being subject to the timer, puts out a continuous signal until such time as a peak occurs to alter its adjustment.

Accordingly, it is an object of this invention to provide a method and means for controlling a process variable with a chromatographic analyzer. It is a further object to provide a method and means for determining the maximum value of a selected component of a sample stream. It is still another object to provide a means, termed a peak reader, to accomplish such control electrically. Other objects and advantages will become apparent from the following disclosure.

In the drawings:

FIGURE 3A, 3B, 3C and 3D represent modifications of the system of FIGURE 3;

Figure 1:
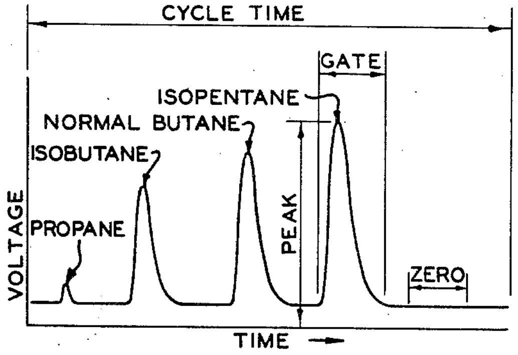
FIGURE 1 is exemplary of a curve generated on a recorder-controller showing a series of peaks as a sample is eluted from the chromatographic column.

Referring now to FIGURE 1 there is shown an example of a series of peaks generated in analyzing a sample that has been placed in a chromatographic column. This may be termed an elution curve. This curve is reproducible in that the components making up a particular sample e.g. a mixture of hydrocarbons, will be eluted from the column in a fixed order. In the curve shown, a hydrocarbon mixture elutes in the order; propane, isobutane, normal butane, and isopentane. The relative peak heights of these curves can be varied by attenuating or amplifying the signals produced by selected components as they are eluted. For example the signal for propane could be amplified to produce a peak with a height on the order of that shown for isobutane.

Assuming, however, that the peaks as shown are not modified by such attenuation or amplification, the only factor that affects the peak is the concentration of the particular component. "Peak" may be defined, for the purposes of this invention, as the maximum signal received during the "gate." The "gate" is the period of time during which the peak reader of the instant invention is in operation to produce a signal representative to the peak generated by a selected component, "cycle time," is the period of time between successive openings of the gate, i.e. successive actuations of the peak reader. Cycle time, for the instant purpose, depends on two things, the intervals at which samples are taken to be analyzed, and elution time for the particular gas in a chromatographic column. Once these two things are determined and the apparatus is adjusted the cycle time becomes a reproducible factor. "Zero" as shown in FIGURE 1 represents the interval when the bridge is compensated for drift (as hereinafter discussed with respect to FIGURES 2, 6 and 7).

Figure 2:
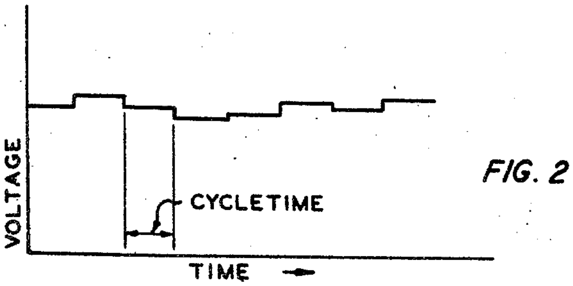
FIGURE 2 shows a curve generated when using the peak reader of the instant invention.

FIGURE 2 shows the curve generated by an instrument such as a recording controller when used in conjunction with the peak reader of the instant invention. As shown, each peak is measured, recorded, and stays recorded until the next cycle brings about the measurement of a new peak which is then recorded. Although the horizontal sections of these curves represent the peak that is read, no change occurs until the next peak is read. The obvious advantages are that the curve is easily read, that a single component is represented thereon, and by virtue of this fact control can be effected from an apparatus using the peak reader. The constant signal produced during the cycle time is suitable for controlling a process.

In the following descriptions, like numbers refer to like apparatus.

Figure 3:
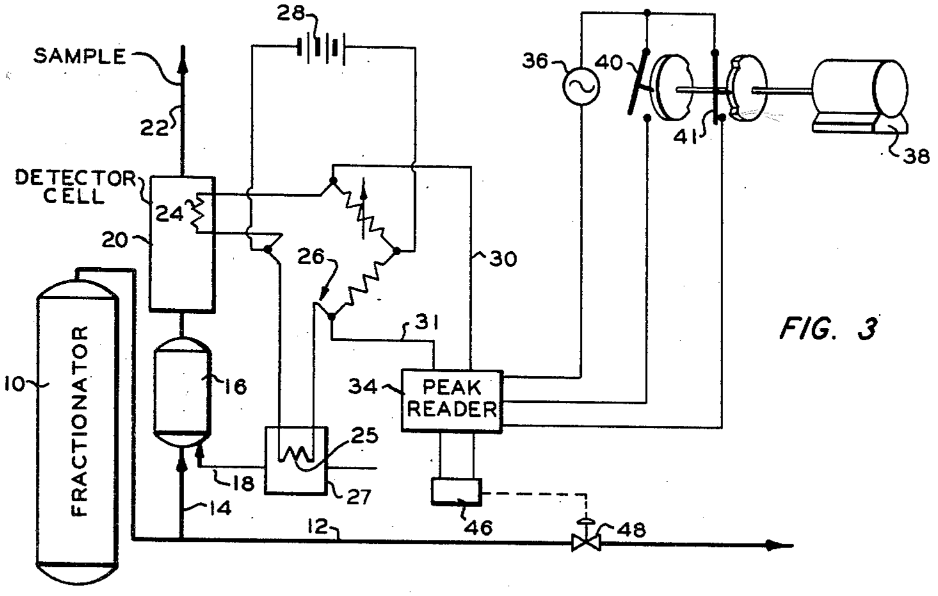
FIGURE 3 illustrates a system in which a peak reader may be incorporated for control.

Referring now to FIGURE 3, there is shown a system employing a peak reader which is operatively associated with a vapor phase chromatographic analyzer, a recorder-controller and a control valve for controlling a process. A product stream leaves the column 10 via a line or conduit 12. Although shown as an overhead stream this could well be a kettle product stream if means were provided for maintaining the sample removed from conduit 12 in a vaporous state during elution. A sample line 14 removes a measured sample from the overhead product line 12. A chromatographic column 16 packed with a material such as Linde Molecular Seive, sold by Union Carbide and Carbon Corporation, receives the sample. A carrier gas is then directed through the column from a conduit 18. Timer-operated valves allow removal of measured samples through line 14 and direct the carrier gas through the column at and for predetermined times, but are not shown here for the sake of clarity. The carrier gas elutes components of the measured sample from the column and the mixture passes into a detector cell 20 wherein a measurement is made and the gases are vented from the cell 20 by means of the vent line 22.

The detector cell includes a thermistor 24 that forms one branch of a bridge circuit 26. Thermistor 25 is another branch of the bridge. These thermistors carry out the measurements that are finally indicated as the curves such as FIGURE 1 responsive to the gases that pass through the cell. In the apparatus shown, the thermistors 24 and 25 are heated by means of electrical energy applied thereto from the battery 28 and the gases that flow past these thermistors cool them. The amount of heat removed from the respective elements 24 and 25 is indicative of which component is being eluted at the particular time.

Thermistor 24 is in actual contact with the eluted sample. Thermistor 25 is disposed in the reference cell 27 and is in contact with a stream of standard gas, preferably the carrier gas, and may be disposed in the line 18 for such contact. Elements 24 and 25 could be bolometers, glow discharge elements, or other such means, as well as thermistors. The particular gases passing element 24 have different heat removal capacities and therefore the amount of unbalance created in the bridge by the heating of the element 24 is indicative of which gas is flowing through the detector cell. A signal is transmitted from the bridge 26 through the conductors 30 and 31 which deliver the signal to the peak reader 34. The details of the peak reader will be discussed hereinafter with respect to FIGURES 5 through 7.

Alternating current is applied from a power source 36 to the peak reader 34. However, the application of this power is timed by means of programmer 38 operating cam driven contactors 40 and 41 so that only a particular peak is read. Contactor 41 operates the peak reader proper and 40 actuates a motor 106 for a null balance device. At no time are both of these switches closed because the two events of peak reading and balancing must occur at different times. This is the peak that is indicated on FIGURE 1 as that occurring during the gate. Once the reading is taken it will remain until the next peak appears during the gate of the next succeeding cycle. That is to say, the peak that is read will provide a continuous signal and will remain as a control element for one complete cycle as indicated by FIGURE 2, for example. The programmer 38 may also operate the measuring and flow valves (not shown) in lines 14 and 18.

Upon proper actuation by the programmer 38, the peak reader is operated to change the signal previously read, if such is necessary. The new signal is sent from the peak reader 34 to a recorder-controller 46. The latter can comprise an instrument such as that described in Catalog No. 8904 of the Brown Instrument Company, Philadelphia, Pennsylvania. The recorder-controller 46 receives a signal squal to the horizontal portion of the curve shown in FIGURE 2 for one cycle time. A signal is sent from the recorder-controller to a control apparatus such as control valve 48 to adjust a process variable of the system in accordance with the signal read at the selected peak. It should be evident that the peak reader allows control of a process according to the component in the gate and that the other components of the sample stream do not effect the controls. It should also be obvious that conventional chromatographic analyzing apparatus are now rendered capable of carrying out this function.

Figure 3A:
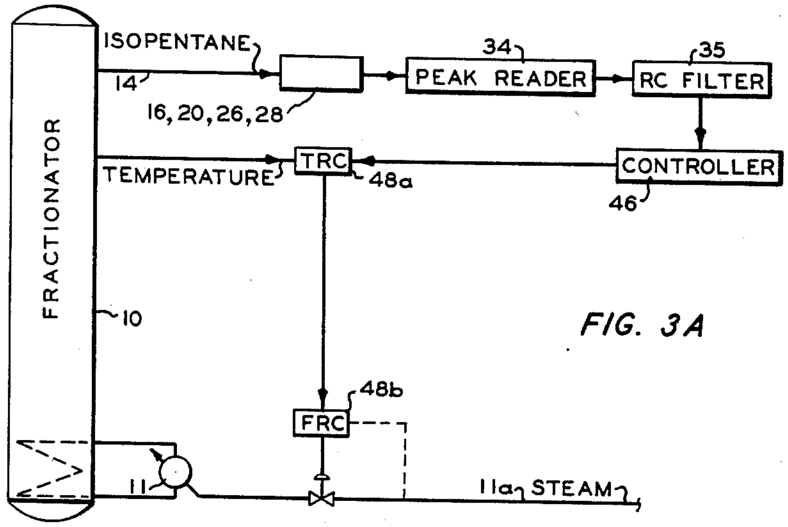

FIGURES 3A and 3B show modifications of the system of FIGURE 3 wherein there are employed means for slowing down the transmission of the changes in the peaks read. The advantage of such a system is that column stability is maintained by avoiding sudden, sharp changes. Also, FIGURES 3A and 3B demonstrate how a system employing a chromatographic analyzer can be employed in overriding other controls, and that other process variables than the overhead stream can be controlled.

In FIGURE 3A, a measured sample is passed through conduit 14 into the analyzer, here denoted for simplicity as elements 16, 20, 26 and 28 of FIGURE 3. The signal thus produced goes to the peak reader 34, the peak goes to a R.C. filter (see FIGURE 3C), where the sharp breaks as in FIGURE 2 are rounded off, and this signal then goes to the controller 46. The signal, if it exceeds preselected limits, then resets the temperature recorder-controller **48*a* which is normally the control. The output signal from 48*a* is transmitted to a flow controller 48*b* which adjusts the steam rate through line 11*a* to reboiler 11**. By way of example, if heavy fractions (isopentane, FIG. 1), exceed a certain amount in the overhead, the steam rate is reduced.

FIGURE 3B shows a modification of FIGURE 3A wherein the filter is disposed between the controller 46 and the temperature recorder-controller **48*a***.

Figure 3C:
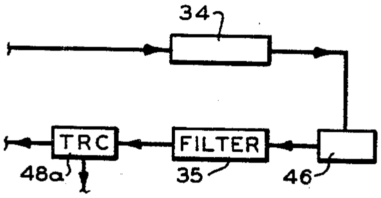
Figure 3C:
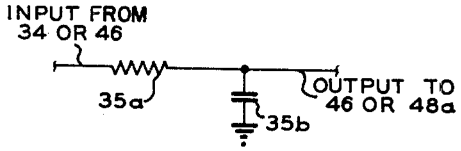

FIGURE 3C shows a construction of the filter 35 if an electrical signal is being transmitted. The filter comprises a resistor **35*a* in series with the terminals and a grounded capacitor 35*b***.

Figure 3D:
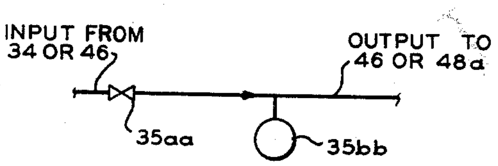

FIGURE 3D is a mechanical analog of the apparatus of FIGURE 3C and may be used if a pneumatic signal is being transmitted. This apparatus comprises a restriction such as an orifice or needle valve **35*aa* upstream of an accumulator 35*bb***.

Figure 4:
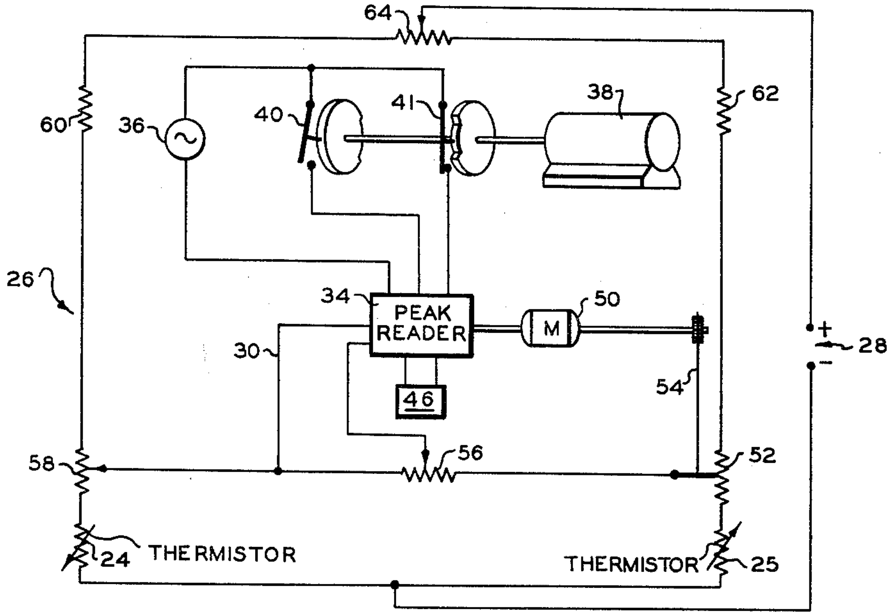
FIGURE 4 shows a preferred form of bridge for use in conjunction with the instant invention.

Referring now to FIGURE 4 there is shown a preferred type of bridge 26 for use in the system of FIGURE 3. A zero motor 50 is associated with the peak reader 34 in a manner which will hereinafter be described. The motor 50 drives the contactor of zero potentiometer 52 through a linkage 54. It is desired to zero the circuit in a timed sequence with the peak reading so that the bridge can be compensated for "drift" for one cycle time. A manually adjusted potentiometer 56 is disposed between the automatic zero potentiometer 52 and the coarse zero potentiometer 58. The coarse zero potentiometer may be manually operated if desired. In the respective branches of the bridge are balancing resistors 60 and 62. A slide wire resistor 64 comprises one of the input terminals to the bridge. The output terminals acually are those at the contactors of potentiometers 52 and 58.

Figure 5:
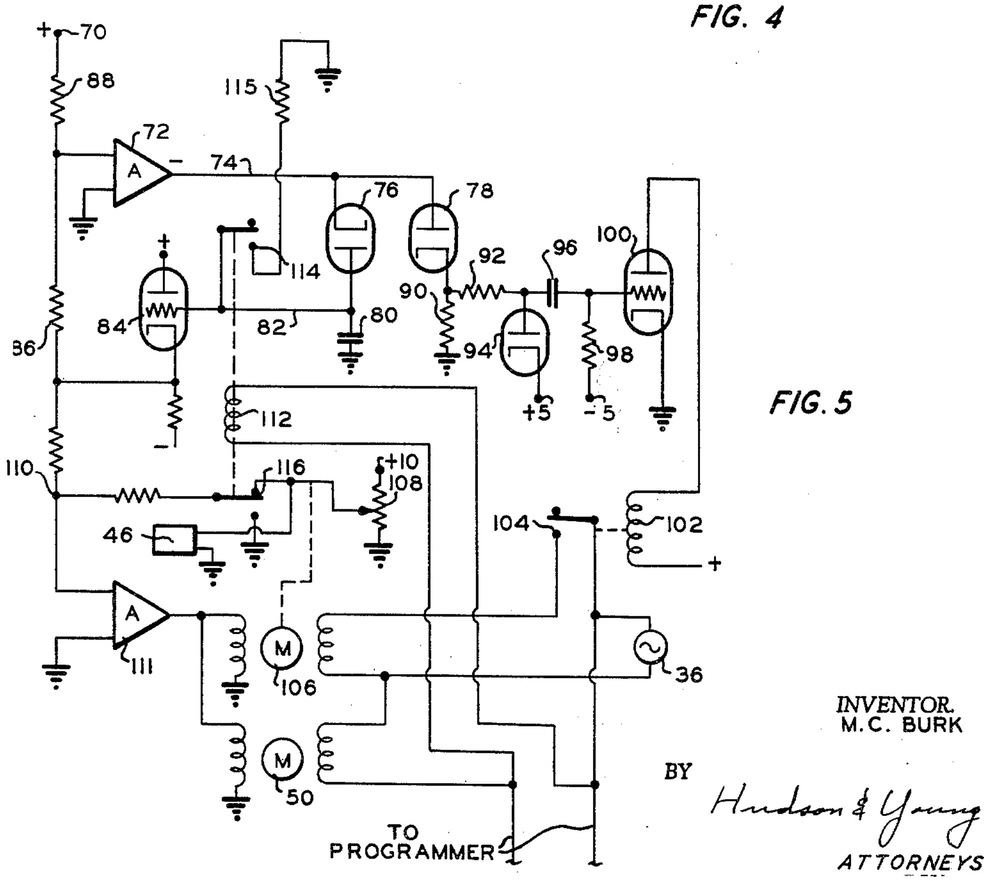
FIGURE 5 shows one embodiment of the instant invention.

Referring now to FIGURE 5 there is shown one form of the peak reader. The terminal 70 is connected to conductor 30 of FIGURES 3 and 4 for receiving the positive direct current signal. This terminal is in turn connected to a phase reversing D.C. amplifier 72 such as that known as model K2–P, produced and sold by George A. Philbrick Researches, Inc., 230 Congress St., Boston 10, Mass. The output from the amplifier 72 is through a conductor 74 which is connected to the cathode of a diode 76 and the anode of a diode 78. The anode of 76 is connected to a capacitor 80. A conductor 82 connects the junction of elements 76 and 80 to the grid of a triode cathode follower 84. The cathode of 84 is connected by means of resistor 86 to the input of the amplifier 72.

The cathode of the diode 78 is connected to ground by resistor 90 and to a resistor 92 and a condenser 96 in series. A diode 94 having a positive bias applied to its cathode has the anode thereof connected between resistor 92 and condenser 96. The condenser 96 is connected on its other side to the grid of a triode 100 and to a source of negative potential through resistor 98.

A relay 102 is connected in series with the triode 100 and has a contact 104 to supply power to the peak reader motor 106. The power is supplied to the field of the motor 106. The control windings of the motor 106 are supplied through a circuit that includes potentiometer 108, summing junction 110, and amplifier 111. The programmer 38 controls the application of power to a relay 112 having contacts 114 and 116 and to the zero motor 50 described above with reference to FIGURE 4.

A negative feed back summing circuit is formed by the apparatus that includes amplifier 72, diode 76, capacitor 80, triode 84, and the resistor 86. When a positive signal that is increasing (such as during the first half of the gate, FIG. 1), is applied to the terminal 70 the output of the amplifier is negative. The diode 76 will conduct and will charge the condenser 80, which having no place to discharge, controls conduction of tube 84. The diode 78 will not conduct during this time. Because of the cathode follower construction of triode 84 a negative signal is fed back through resistor 86 to the input of 72. When this input signal passes the peak of the gate (as shown in FIGURE 1), the diode 76 shuts off, capacitor 80 can't discharge and therefore applies a constant grid voltage to triode 84, and a negative input is then applied to the amplifier 72 because the capacitor 80 continually puts out a negative grid voltage which causes this effect. This causes the amplifier output to change polarity, hence a positive signal appears on conductor 74.

When the input to amplifier 72 becomes negative the diode 76 no longer conducts but the diode 78 conducts. When this occurs the time constant of the R.C. circuit consisting of resistor 98 and the capacitor 96 permit a bias to be applied to the grid of the triode 100 which causes the triode to conduct for the period determined by the time constant. When such conduction takes place the relay 102 is actuated and makes contact 104. This applies A.C. power to the field of motor 106. The motor 106 rotates until a zero voltage appears at its control windings. This is in effect a null balance construction wherein the output from cathode follower 84 is summed with the potential applied to junction 110 from potentiometer 108 and the sum thereof controls the motor 106. The motor rotates to move the contactor of potentiometer 108 until balance is reached. Shortly after this event the tube 100 ceases to conduct, the relay 102 opens the contact at 104, and motor 106 can no longer turn.

The programmer 38 now actuates the relay 112 to discharge the capacitor 80 by making a contact to ground at contact 114 through resistance 115. The potentiometer 108 is also disconnected from the circuit by breaking the contact at 116. The zero motor 50 is put into operation by the programmer and operates to bring the bridge circuit such as in FIGURE 4 to an automatic zero position.

The effect of the operation of this circuit is that the condenser 80 provides a continuous output to the motor 106 for the period of time desired and thereby permits a peak to be read. By virtue of the setting of potentiometer 108 and the subsequent automatic zeroing of the bridge as shown in FIGURE 4 a continuous output for one cycle is provided as illustrated in FIGURE 2.

Figure 6:
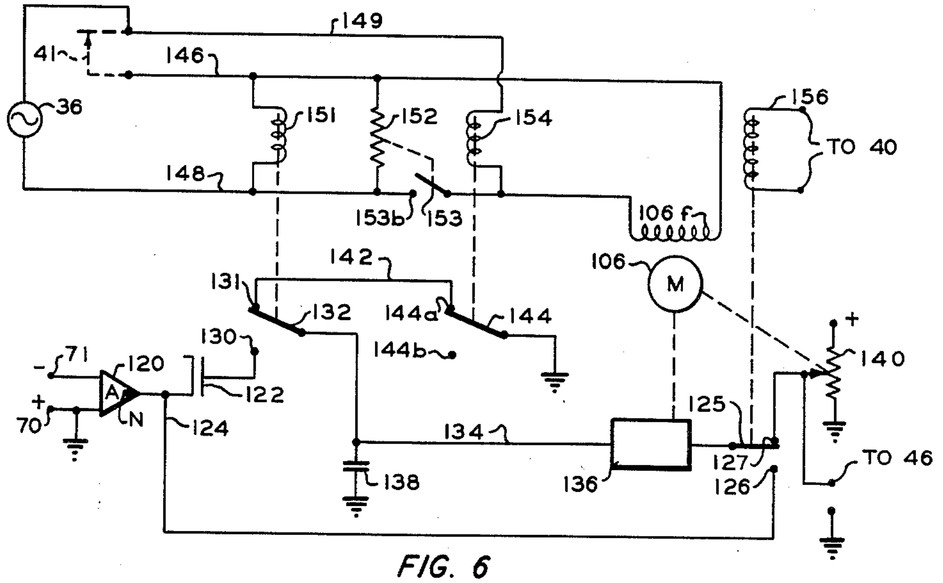
FIGURE 6 shows schematically another embodiment of the instant invention.

Referring now to FIGURE 6 there is shown another embodiment of the peak reader. The same cardinal principles as in the system of FIGURE 5 are employed in this system. That is, the system uses a capacitor to store the charge and then to produce a continuous output signal derived from the peak having been passed. Also, mechanism is provided to connect the recorder-controller to the contactor of a potentiometer so that a continuous signal is provided to the controller. Further, the zero and the balancing motor are never operated at the same time. The elements of FIGURE 6 are shown in their positions before the gate occurs.

In FIGURE 6 the programmer contactor 41, the alternating current source 36 and the motor 106 having a shaded pole field **106*f* are substantially the same as in FIGURE 5 and the foregoing figures. The input terminals for the D.C. signal at 70 and 71 show that the amplifier of FIGURE 6 receives the negative signal and the positive is grounded. The amplifier 120 is connected to the cathode of a diode 122. The output is also connected by a conductor 124 to a contact 126 which is part of a switch 125. The contact 127 is paired with 126** and is connected to a potentiometer as will hereinafter be explained.

The anode of diode 122 is connected to the contact 130 which is operatively associated with another contact 131 and a contactor 132. The contactor 132 is connected by a conductor 134 to a null detector 136, (constructed as in FIGURE 10, hereinafter explained), and is also connected to one side of a capacitor 138, the other side of which is connected to ground. The conductor 134 leads to the input on one side of the null detector. The other side of the null detector is connected by means of a contactor 125 and contact 127 to the potentiometer 140. The contactor of potentiometer 140 is driven by the motor 106 and is connected to a terminal which leads to recorder-controller 46.

The terminal 131 is connected to a conductor 142 which is in turn connected to a contact **144*a* that is operatively associated with a contactor 144 which is connected to ground and has an alternate position at contact 144*b***.

The circuit from alternating current source 36 through programmer contact 41 provides three parallel circuits—those through relay 151, delay relay 152, and motor field coil **106*f*. The relay 152 operates a switch 153 to make or break the contact 153*b* in the line 148. Another circuit from the source 36 passes through relay 154 which is connected between the motor field coil 106*f* and the contact 153*b*. The relay 151 operates contactor 132, the relay 154 operates contactor 144**.

In the operation of this device, the programmer causes the contact at 41 to open when the gate occurs. The apparatus in FIGURE 6 is shown in the postion it would assume before such opening. When the contact at 41 opens the following events take place; relay 151 is de-energized and contact between 132 and 130 is made which connects the anode of the diode 122 to the capacitor 138 and the null detector 136. The capacitor builds up a charge through the diode in a manner similar to that of 80 in FIGURE 5. The relay 152 is de-energized, but this is a thermal type delay relay, therefore, the switch 153 will not make for a predetermined period of time, in this instance 10 seconds. Relay 152 (of the thermostatic type), is produced by Amperite Company, Inc., 561 Broadway, New York 12, N.Y. The switch 153, remaining open, will therefore leave the relays 154 and the motor field 106*f* in a de-energized condition. After 10 seconds the thermal element of relay 152 will cause the switch 153 to close. When this happens the motor field coil is in a position to be energized upon the closing of relay 41. However, the relay 41 does not close immediately. When relay 152 closes switch 153 the relay 154 is actuated and breaks the contact between conductor 142 and ground by moving the switch 144 away from contact 144*a* to contact 144*b*.

The next event is the closing of the contact 41 by the programmer. When this occurs the condenser 138 is then connected to the conductor 142 by making a contact at 131. However, 138 is not connected to ground, that is, is not discharged this time because the connection at contact 144*a* is not made. Most important, when the contact at 41 has closed, the power is applied to the field coil 106*f* and the motor 106 then rotates to adjust the potentiometer 140. Delay relay 152 does not yet break the connection at 153.

The motor 106, in adjusting the potentiometer 140, responds to an unbalance created in the null detector between the signal received from conductor 134 and the potentiometer 140. The adjustment of potentiometer 140 by rotation of the motor brings this to a null condition.

Before the motor begins to adjust potentiometer 140, the signal applied to terminal 71 is amplified and passes through diode 122, the contact 130 and contactor 132 and into the null detector through conductor 134. This process builds up a charge on the capacitor 138. This charge reaches the maximum value at the peak (as indicated in FIGURE 1) of the selected component and, until the condenser at 138 is discharged, remains at such maximum value thereby to provide a continuous maximum signal to the null detector so that the motor 106 can operate responsive to the unbalance thereby created. The diode 122 cuts off when the peak occurs. After the time of the peak, the contacts 41 close and motor 106 brings the system 140 to null as explained above.

After the motor has brought the system to a null point, the delay relay 152 breaks the contact at 153*b*. This shuts off the motor and grounds out the capacitor 138 through the contact 131, the conductor 142, and the switch 144, which has been engaged with the conductor 142 upon the de-energization of the relay 154 responsive to the breaking of the contact 153*b*.

The next event that will occur will be the zeroing of the entire bridge which is caused by the programmer actuating the relay 156, switch 125, and a zero motor which will be explained hereinafter with reference to FIGURE 8.

Figure 7:
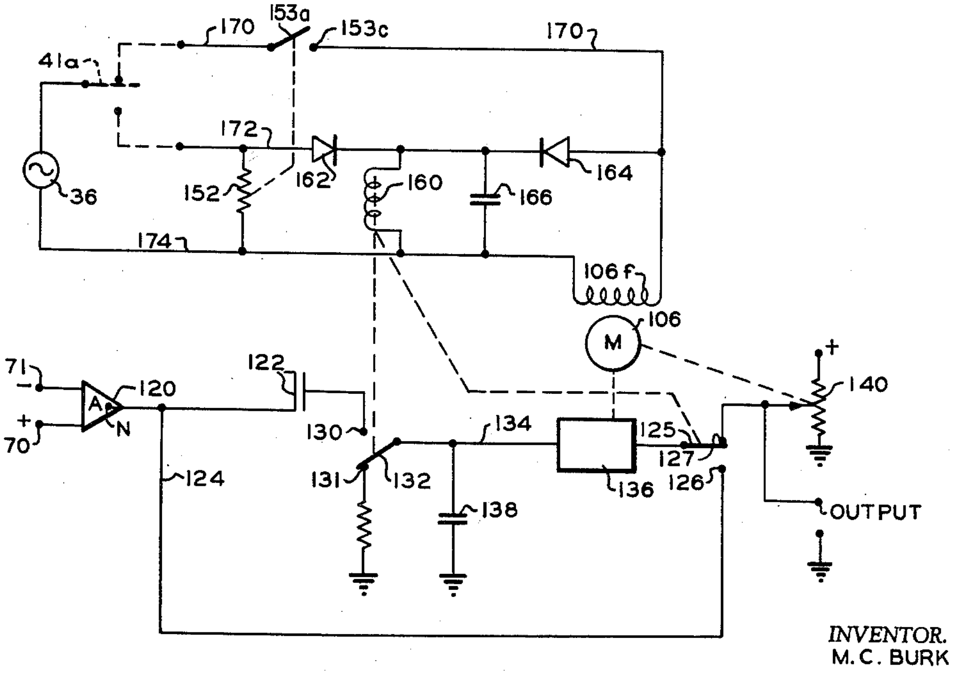
FIGURE 7 shows a modification of the apparatus of FIGURE 6.

Referring now to FIGURE 7 there is shown a modification of the apparatus of FIGURE 6. In substance, the circuit is a simplification of FIGURE 6 wherein the functions of relays 151 and 154 are combined in the relay 160 and the circuit to discharge the capacitor 138 is likewise simplified.

The switch 41*a* is actuated by the programmer but is a modification of that previously shown because it is a double throw switch. The switch 153*a* serves the same function as switch 153 in FIGURE 6 but is located in a different portion of the circuit. The relay 160, as previously stated, serves the same function as relays 151 and 154. Selenium rectifiers 162 and 164 with a capacitor 166 therebetween are provided. The conductor 170 connects the A.C. source to the motor field 106*f* through the contact 153*c*. The conductors 172 and 174 provide parallel circuits through relays 152, 160, and condenser 166 between the lower terminal of 41*a* and the alternating current source 36. The motor field 106*f* is disposed between conductor 174 and the junction of 170 with 172. The rectified 162 is disposed in the conductor 172 between the connections to relays 152 and 160. The rectifier 164 is connected in 172 between the capacitor 166 and a junction with conductor 170.

In operation, the apparatus of FIGURE 7 is initially in position as shown in the drawing. First, switch 41*a* is moved down by the programmer. The relays 152 and 160 are energized. The relay 160 connects capacitor 138 to the output of the amplifier 120 through the diode 122 and switch 132, and connects the other null detector input to the storage potentiometer 140 via switch 125. After approximately 2 seconds the thermal time delay relay 152 closes the contact 153*a* thus preparing the circuit of conductor 170 to conduct current to motor field coil 106*f*.

When the programmer moves the contactor of 41*a* up, power is applied to the conductor 170 thus energizing the motor field coil 106*f*, and relay 160 through contact 153*a*. The relay 160 does not drop out during the switching because of the condenser 166 across the conductors 172 and 174. During the time required for relay 152 to cool (it being a thermal relay) the motor 106 drives the contactor of potentiometer 140 such that the voltage output equals that stored on condenser 138.

Next, relay 160 shorts one null detector input to ground thus discharging 138 and connects the other null detector input to the output of the amplifier 120, when relay 152 opens the contact 153*a*.

Since the control windings of zero motor 50 are connected in parallel with those of the motor 106, the null detector actuates the zero motor 50 when the field winding thereof is energized by the programmer as is hereinafter dscribed with respect to FIGURE 9.

Figure 8:
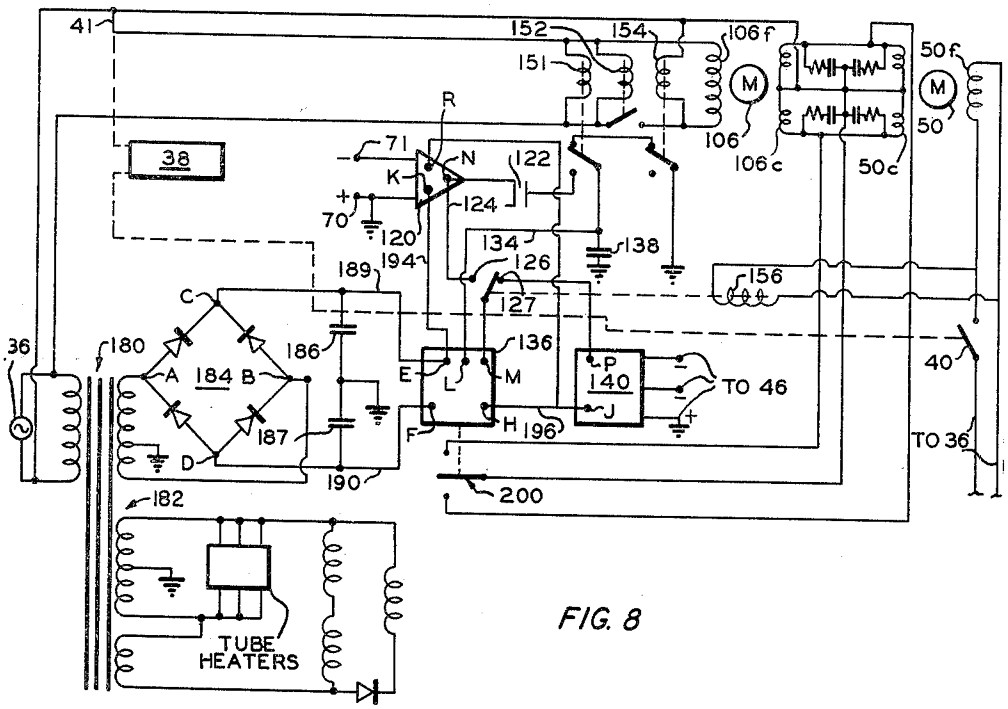
FIGURE 8 shows in detail the construction of the apparatus of FIGURE 6.

In FIGURE 8 there are shown the actual connections of the circuit described in FIGURE 6. A step-down transformer 180 provides a source of power derived from the generator 36. At 182 is shown the secondary of the transformer which provides the tube heaters in the circuits of the amplifier null detector and potentiometer with power. A full-wave rectifier 184 has separate taps on the secondary of transformer 180 and is provided with input terminals A and B and with output terminals D and C and a filter comprising capacitors 186 and 187. Conductors 189 and 190 convey direct current to the input terminals E and F which comprise the power supply for the null detector 136. The terminal E on the null detector is also connected to conductor 194 which provides direct current power to the amplifier 120. The terminal K represents the power input of the amplifier 120. The amplifier 120 is provided with a direct current signal output terminal N which is connected through the conductors 124 and 134 as described above to signal input terminals M and L, respectively, as described above.

The terminal L on the null detector receives an input signal from the D.C. amplifier 120 through connection 134. The terminal M on the null detector is the other signal input terminal which is connected to the potentiometer 140 as described above through the contact 127. A connector 196 provides D.C. potential to the potentiometer 140 and connects a terminal H on the null detector with a terminal J on the potentiometer. Direct current is provided to one tube of the amplifier by a connector between 196 and amplifier terminal R.

At 200 is a three position switch which is actuated by the null detector 136. If the null detector senses no unbalance between the input signal at capacitor 138 and the input signal from potentiometer 140, there will be no movement of the contactor of the switch 200, hence there will be no adjustment made because there will be no change in the peak that was read from the previous peak.

On the other hand, if a change is sensed by the null detector, it will move the contactor of switch 200 up or down according to the direction of the change. It must be remembered that the motors 106 and 50 are shaded pole motors and when the field coils of either are actuated, that is, energized by the programmer, an induced voltage appears in the control windings 106c and 50c respectively. When an unbalance is felt in the null detector and the switch 200 is actuated, one of the two control windings in the motor 106 is shorted out and this coil causes the motor to turn in the desired direction to adjust the position of the contactor on potentiometer 140.

The zero operation takes place when the programmer operates the relay 156, a signal (e.g. FIG. 1), is applied to the null detector. At this time, if there is any unbalance in the circuit due to aging of the thermistors 24 and 25, the motor 50 will be operated in the same manner as the motor 106 and will proceed to adjust the position of the contactor of potentiometer 52 as shown in FIGURE 4.

Figure 9:
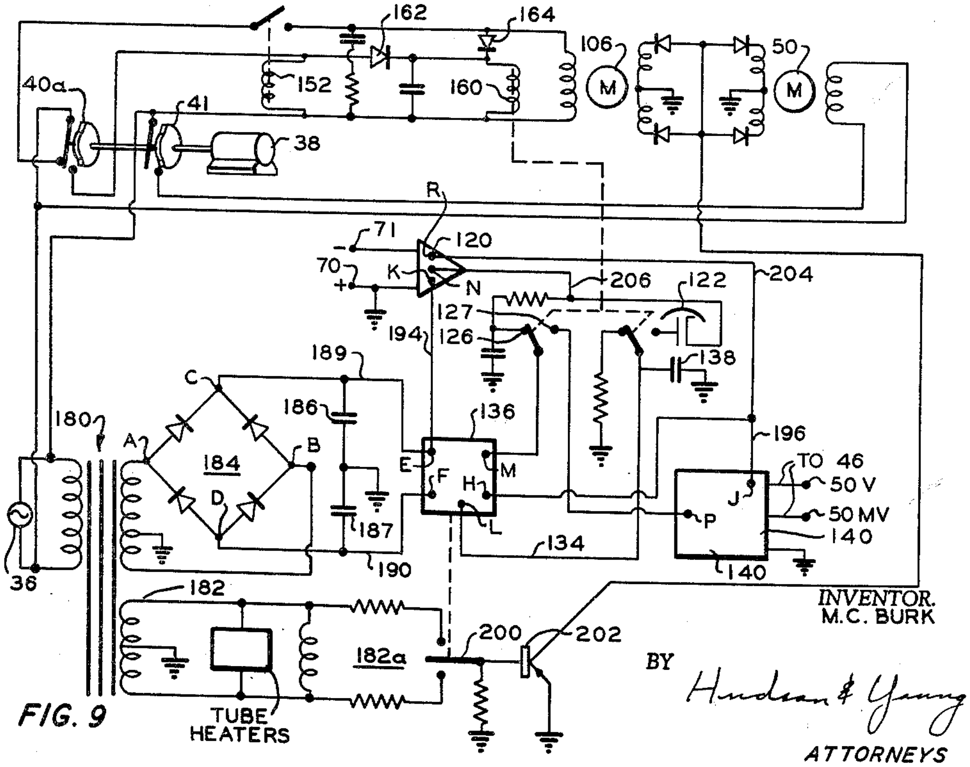
FIGURE 9 shows a construction of the apparatus of FIGURE 7.

Referring now to FIGURE 9, there is shown substantially the same apparatus as in FIGURE 8, which was modified in the manner set forth with respect to FIGURES 6 and 7 above. It will be noted that a portion 182a of the circuit connected to the secondary 182 of transformer 180 has been modified to provide a control signal to the poles of the motors 106 and 50. Also in series with the relay 200, there is shown a transistor 202 which is also in series with the two motors. Branching from the connector 196 is a connector 204 which connects to amplifier terminal R and which provides direct current to the one tube in the amlifier as will be hereinafter described with respect to FIGURE 12. There is shown a junction 206 for receiving the output signal from the D.C. amplifier 120.

In operation this apparatus is quite similar to that of FIGURE 8. When an unbalance is determined by the null detector, the three position relay makes one of the contacts provided in circuit 182a. This is amplified through the transistor 202 which loads one or the other of the control windings of the motor 106 or 50, as the case may be. When this unbalance is provided, the motor will turn in the direction indicated thereby.

It will be noted that the circuits of FIGURES 6, 7 and 8 provide three output terminals from the potentiometer 140, one of which is common to ground and the other two of which are negative, having different voltages thereon. It is a matter of choice to the operator or the designer as to which of these outputs is selected.

Figure 10:
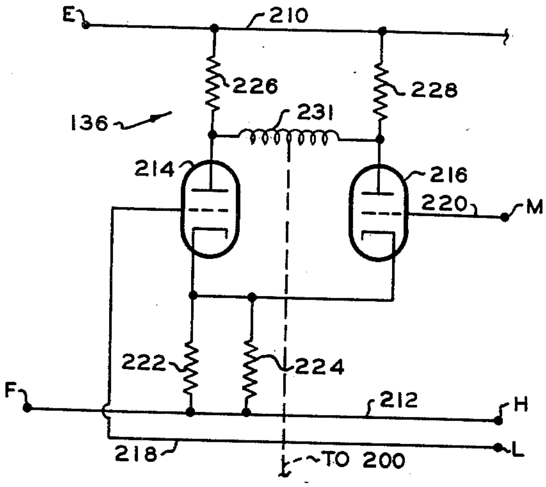
FIGURE 10 shows a construction of a null detector suitable for use in the apparatus of FIGURES 8 and 9.

Referring now to FIGURE 10 there is shown a null detector 136. The conductors 210 and 212 provide D.C. power from the terminals E and F, respectively. The triodes 214 and 216 receive the signals from the amplifier 120 and from the potentiometer 140 during peak reading (see FIGURES 8 and 9), respectively, and the triode 216 receives the signal from amplifier 120 during zeroing. These triodes amplify the signals received by them. A conductor 218 provides the D.C. signal to grid of triode 214. The conductor 220 provides a signal to the grid of the triode 216 from the potentiometer through the terminal M. The resistors 222 and 224 connect the negative D.C. power conductor 212 to the triodes 214 and 216, respectively. The resistors 226 and 228 connect the positive D.C. power conductor 210 to the anodes of the respective triodes. A relay 231 is connected at one end to the anode 214 and at the other end to the anode 216. In operation when a peak is being read, the triode 214 receives a signal on its grid representative of a peak. The triode 216 receives a signal on its grid representative of the voltage at the potentiometer. The difference of these signals is sensed across the impedance or relay 231 and the direction thereof is also sensed. 231 moves in accordance with the direction of the signal to actuate the three position relay 200 as above explained. When the zeroing operation is being carried out, the tube 214 receives zero signal and 216 receives such signal as there is from the amplifier 120. If other than the zero signal (as indicated on FIGURE 1) appears on the grid of 216, the resulting unbalance sensed across the relay 231 causes the zero motor 50 to operate by the actuation of three position switch 200. This, of course, adjusts the position of the contactor of potentiometer 52 of FIGURE 4.

Figures 11, 12:
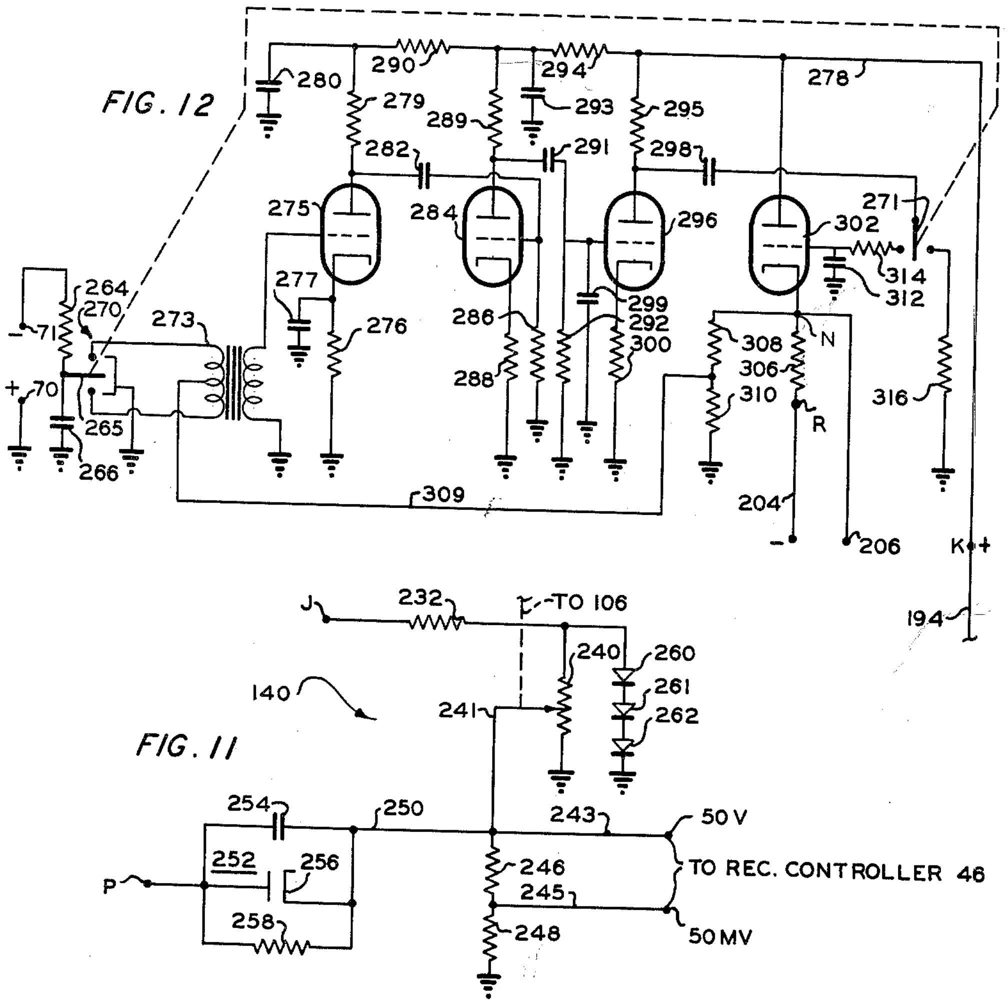
FIGURE 11 shows a construction of a preferred form of potentiometer and controls therefore suitable for use in the apparatus of FIGURES 8 and 9.
FIGURE 12 shows a construction of a preferred form of direct current amplifier for use with the instant invention in the circuits of FIGURES 8 and 9.

Referring now to FIGURE 11, there are shown the details of the potentiometer 140. At J is indicated the input terminal and at P is one output terminal for connection to the null detector terminal M through contact 127. A resistor 232 is connected to the input terminal at one end and has the other end thereof connected to the potentiometer 240. The other end of the 240 is grounded. Contactor 241 is driven from the motor 106. Contactor 241 is connected to ground through series connected resistors 246 and 248. Conductors 243 and 245 are connected to the contactor 241 and to the junction before resistors 246 and 248, respectively, to provide the output signals to recorder controller 46. A conductor 250 connects the contactor 241 to a diode compensating network 252, which is in turn connected to the output terminal P. The network is comprised of a capacitor 254, a diode 256 and a resistor 258, in parallel. At the top part of the element 240 is connected, in series, 3 Zener diodes, 260, 261 and 262. The latter elements are connected at their other end to ground.

As mentioned above with respect to FIGURES 8 and 9, the potentiometer 140 receives D.C. power from the secondary of the transformer 180 at the terminal J. The motor 106 adjusts the contactor 241 and the resultant or a proportional voltage appears at the terminal P. Likewise, the same voltage appears along conductors 243 and 245, respectively, and is continuously provided to the recorder controller 46 until the next time an adjustment is made in the position of contactor 241. In any event, the important thing about this apparatus is that the output always and continuously appears along 243, 245 and, therefore, is continuously provided to the recorder controller 46.

Referring now to FIGURE 12, there are shown the details of an amplifier used with the apparatus of FIGURES 6 and 7. The input terminal 70 is connected in series to a resistor 264, a contactor 265, a capacitor 266, and ground. The contactor 265 is part of a chopper 270 which operates in synchronized movement with chopper 271 at the output end of the amplifier. The choppers are operated by power from the transformer secondary circuits 182, or 182a as the case may be (see FIGS. 8 and 9). The chopped signal is fed to the primary of the transformer 273. The secondary of the transformer has one side grounded and the other side is connected to the control grid of a triode 275. The cathode of the triode is connected to a ground through a resistor 276 and capacitor 277. The anode of the triode 275 is connected through resistors 279, 290 and 294 and conductor 278 to terminal K which receives D.C. power. The junction between resistors 279 and 290 is grounded through a capacitor 280. The anode of 275 is connected directly to a capacitor 282, thence to the control grid of a triode 284. The control grid of 284 is grounded through a resistor 286. The cathode of 284 is grounded through a resistor 288. The anode of 284 is connected to a resistor 289 which is in turn connected to the junction between resistances 290 and 294. A decoupling condenser 293 is connected between ground and the junction between resistances 290 and 294. The anode of 284 is connected to the control grid of the triode 296 through a circuit that includes the capacitor 291 and a circuit to ground through a filter comprising the capacitor 299 and resistor 292 in parallel.

The anode of triode 296 is connected to the positive power supply lead 278 through resistance 295. The cathode of 296 is connected through resistor 300 to ground.

The conductor 278 is connected directly to the anode of triode 302. The cathode of 302 is connected to a negative D.C. potential source input line 204 by means of a resistor 306. The cathode is also attached to the primary of the transformer 273 through a resistor 308 and a conductor 309 in series. The resistor 310 connects the junction of 308 and 309 to ground. The control grid of the triode 302 is connected to one side of the chopper 271 through a grounded capacitor 312 and resistor 314.

The conductor 278 connects the anode of 302 to the terminal K which is the source of D.C. potential, as previously noted. The other side of the chopper 271 is connected to ground through a resistor 316.

As will be noted the conductor 309 constitutes a feed back between the cathode of the triode 302 and the transformer 273. The chopper 271 is actually a full-wave chopper. The tube 302 is connected to the power supply at both its anode and cathode through conductors 278 and 204 respectively. The grid voltage is provided by the chopper 271 with the condenser 312 smoothing out the signal applied to the grid. Tube 302 is actually connected as a cathode follower with the output signal appearing at junction 206 (FIGURE 9), or at diode 122 and contact 126 (FIGURE 8).

In operation of the amplifier, the input signal appears at the terminal 71 and is chopped. The chopped signal passes through three stages of amplification (in tubes 275, 284 and 296), where each stage has the signal applied to the grid of the next succeeding state. The fourth stage has a signal applied to the control grid but being a cathode follower the output signal, which in this case is the final signal, appears at the cathode and at the junction 206. The chopper in combination with the filtering action of resistor 314 and capacitor 312 provides a D.C. output signal that is stored on the capacitor 138.

To summarize the operation of this invention, FIGURE 3 is first referred to. As the overhead product stream passes through the conduit 12, the programmer 38 operates a measuring valve (not shown) disposed in line 14 to admit a measured sample into the column 16. A carrier gas is then admitted through another programmer controlled valve disposed in the conduit 18. The carrier gas elutes the components of the sample but no change in the signal at the recorder-controller 46 is sensed until the peak occurs during a gate.

If the embodiment of FIGURE 5 is used as a peak reader, the programmer next actuates relay 112 to position the switches controlled thereby. While the signal increases to the peak, the diode 76 conducts, and capacitor 80 stores a charge thereon. When the peak occurs, the diode 76 cuts off and the diode 78 conducts while the signal from the capacitor 80 is utilized to operate the potentiometer motor 106. The signal, as adjusted, is provided to the recorder-controller 46 which, in the embodiment shown, adjusts a control valve 48 (FIGURE 3). Of course, no adjustment takes place if the peak is the same peak as that read during the preceding cycle. In any event, the potentiometer signal is continuously provided to the recorder-controller 46, substantially as shown in FIGURE 2. After the peak is read, the triode 100 shuts off the power to the servo-motor 106. The operation of the circuit of FIGURE 5 during these events is described above in greater detail. The next major event that occurs is zeroing of the bridge, which is accomplished by the programmer 38 rendering the zero motor 50 responsive to any bridge imbalance as sensed at the terminal 70 from the lead 30 (FIGURE 4). If there is imbalance, the bridge is corrected by adjusting the position of the contactor of the adjustable resistor or potentiometer 52. A short time after this is accomplished, the programmer shuts off the zero motor power and completes preparation of the peak reader for the next cycle.

Meanwhile, of course, the signal from the potentiometer 108 is being continuously provided to the recorder-controller 46 which in turn controls a process variable by adjusting a means such as the valve 48 (FIGURE 4) responsive to the signal.

If the embodiment of FIGURES 6 and 8 is used as a peak reader, the programmer 38 opens the gate by breaking the contact at 41 at a predetermined time after the carrier gas has begun to elute the sample. The mode of obtaining the sample is the same as described above with respect to FIGURE 5. When the gate opens, power is removed from the relays 151 and 152 to render the diode 122 conductive. When diode 122 starts to conduct, the input signal from the bridge 26 that appears at terminal 71 is amplified by being synchronously chopped, amplified in three stages, and again synchronously chopped, the power therefore being provided from rectifier 184 and appearing at amplifier terminal K, as described in detail with respect to FIGURE 12. The amplified D.C. signal appears at amplifier terminal N, passes through the diode 122 and charges the capacitor 138 and continues to do so until the peak occurs.

When the peak occurs the diode 122 shuts off and the charge on capacitor 138 is then impressed on terminal L of the null detector (FIGURES 8, 10). This bias operates on the control grid of the triode 214. Meanwhile, a potential from the potentiometer 140 has been impressed on the grid of the triode 216 through the terminals M and P. The imbalance, if any, is sensed at the relay 231 which positions the switch 200 to thereby determine the direction of rotation that servo-motor 106 will take when it is actuated.

A short time after the peak the delay relay 152 makes the contact **153*b* thereby preparing the circuit for servo-motor 106 to operate. The programmer 38 then closes the contact 41 and servo-motor 106 rotates to adjust the contactor of potentiometer 140 and to thereby balance the signal in the null detector so that relay 231 returns the switch 200 to its neutral position. As with the embodiment of FIGURE 5, the potentiometer signal is transmitted continuously to the recorder-controller 46, which then adjusts a means, such as valve 48**, to control a process variable.

The peak has now been read and the next operation is zeroing the bridge upon actuation of relay 156 by the programmer. When this event occurs, the bridge signal on lead 30, which appears at terminal 71, if any, is amplified as described above and transmitted from terminal N to terminal N through lead 124 and contact 126. This, in effect, is the same as balancing the bridge signal against zero in the null detector. If the bridge is in balance, there is no signal across the relay 231, but if it is out of balance, the switch 200 makes one or the other contacts to short out a pole on servo-motor 50, and the latter rotates to adjust the potentiometer 52 (FIGURE 4). The programmer, of course, applies power to the field **50*f* of said motor. After this event the programmer 38 opens the switch 40** and the peak reader, bridge, and control system remain in repose until the next gate occurs.

The operation of the apparatus described in FIGURES 7 and 9 is quite similar to that set forth for the embodiment of FIGURES 6 and 8. The explanation of how the embodiment of FIGURE 7 operates is set forth in detail above, and since the cooperation of the circuit with other elements is otherwise substantially the same as described for FIGURE 6, it will not be dealt with at length. It should be noted that in FIGURE 9 the servo-motor 106 and the zero motor 50, instead of having a field coil shorted out by the switch 200, receive an amplified signal from the transistor 202.

In all embodiments the output signal is provided to a recorder-controller 46 (FIGURE 3, 3A) which records the new peak to provide a record as shown in FIGURE 2. The controller 46 can provide either a pneumatic or electrical signal to other control apparatus to regulate a process variable. Further, as shown in FIGURE 3, for instance, the controller operates a valve 48 in the overhead withdrawal line. If desired, of course, other fluid streams may be controlled, as shown in FIGURE 3A which also demonstrates that the chromatographic analyzer using the peak reader may be employed in a system where the controls are cascaded. Kettle, feed, or reflux streams may also be controlled.

In all embodiments it is also desirable that, after the peak has been read and the potentiometer adjusted, the programmer 38 close the gate and later shut off the eluting flow of carrier gas through line 18. A "flushing" flow of the same gas, e.g., helium, is then carried out to remove all measurable traces of the sample in order to prepare the column 16 for subsequent samples and readings.

When the system has been zeroed and sufficient flushing of the column 16 has taken place, another reading may be taken. Inasmuch as the flushing takes considerable time it has been found desirable to employ multiple columns 16 in order to achieve a more continuous measurement and better control. This requires a programmer designed with means for actuating a plurality of valves.

It should be apparent from the foregoing disclosure that this invention provides a novel means for controlling a process respnsive to the concentration of one of the components in a sample stream as determined in a chromatographic analyzer. This apparatus, in effect, filters out the desired signal from a plurality of signals, each of which denotes a different component in the sample stream. Means are provided whereby a continuous output signal is provided responsive to the selected signal and corrections are made as the selected signal changes.

It is not my intention to be bound or limited to the subject matter disclosed in the accompanying drawing, specification and claims, but include as my invention all thee modificationst hereof which would be apparent to one skilled in the art. For example, the peak reader could employ transistors in lieu of the triodes shown. Also, the peak reader itself is suitable for use in combination with other means than a chromatographic analyzer for antomatically analyzing batched, measured samples, and effecting control therefrom, e.g. mass spectrometers, titrimeters, and optical analyzers which operate by scanning a portion of the spectrum.

I claim:

1. A circuit for providing a signal of reverse plurality when a maximum value of the input signal has been passed comprising a phase reversing direct current amplifier having input and output terminals, a diode having its cathode connected to an output terminal of said amplifier, a condenser having one terminal connected to the anode of said diode, means connecting the other terminal of said condenser to a reference potential, a triode having its control grid connected between said condenser and said diode anode, means connecting the anode of said triode to a source of positive potential, a first resistor, the cathode of said triode being connected to said first resistor, said first resistor being connected at its other end to a source of negative potential, a second resistor, means connecting said second resistor between said cathode of said triode and an input terminal of said amplifier to thereby complete a feedback circuit.

2. A circuit for providing a signal of reverse polarity when a maximum value of the input signal has been passed comprising a phase reversing direct current amplifier having input and output terminals, a diode having its cathode connected to an output terminal of said amplifier, a condenser having one terminal connected to the anode of said diode, means connecting the other terminal of said condenser to a reference potential, a triode having its control grid connected between said condenser and said diode anode, means connecting the anode of said triode to a source of positive potential, a first resistor, the cathode of said triode being connected to said first resistor, said first resistor being connected at its other end to a source of negative potential, a second resistor, means connecting said second resistor between said cathode of said triode and an input terminal of said amplifier to thereby complete a feedback circuit, a potentiometer having an adjustable contactor, means for applying a source of potential across said potentiometer, means for summing the signal appearing at the cathode of said triode and the signal on the contactor of said potentiometer, and means responsive to the summed signal from said means for summing to adjust said potentiometer contactor until the summed signal is zero.

3. A circuit for providing a constant signal proportional to the maximum value of the input signal comprising a phase reversing direct current amplifier having input and output terminals, a diode having its cathode connected to an output terminal of said amplifier, a condenser having one terminal connected to the anode of said diode, means connecting the other terminal of said condenser to a reference potential, a triode having its control grid connected between said condenser and said diode anode, means connecting the anode of said triode to a source of positive potential, a first resistor, the cathode of said triode being connected to said first resistor, said first resistor being connected at its other end to a source of negative potential, a second resistor, means connecting said second resistor between said cathode of said triode and an input terminal of said amplifier to thereby complete a feedback circuit, a potentiometer having an adjustable contactor, means for applying a source of potential across said potentiometer, means for summing the signal appearing at the cathode of said triode and the signal on the contactor of said potentiometer, and means responsive to the summed signal from said means for summing to adjust said potentiometer contactor until the summed signal is zero, means responsive to an output signal from said amplifier that said diode will not conduct for applying power to said means to adjust whereby the latter is rendered operative upon such an output signal occurring, and means to remove power from said means to adjust a predetermined time after said diode ceases to conduct.

4. A circuit for providing a signal when a maximum value of the input signal has been passed comprising a phase reversing direct current amplifier having input and output terminals, a diode having its cathode connected to an output terminal of said amplifier, a condenser having one terminal connected to the anode of said diode, means connecting the other terminal of said condenser to a reference potential, a triode having its control grid connected between said condenser and said diode anode, means connecting the anode of said triode to a source of positive potential, a first resistor, the cathode of said triode being connected to said first resistor, said first resistor being connected at its other end to a source of negative potential, a second resistor, means connecting said second resistor between said cathode of said triode and an input terminal of said amplifier to thereby complete a feedback circuit and means to supply said amplifier with input signals for a predetermined period of time at preselected intervals of time.

5. A circuit for providing a signal when a maximum value of the input signal occurred comprising a phase reversing direct current amplifier having input and output terminals, a diode having its cathode connected to an output terminal of said amplifier, a condenser having one terminal connected to the anode of said diode, means connecting the other terminal of said condenser to ground, a triode having its control grid connected between said condenser and said diode anode, means connecting the anode of said triode to a source of positive potential, a first resistor, the cathode of said triode being connected to said first resistor, said first resistor being connected at its other end to a source of negative potential, a second resistor, means connecting said second resistor between said cathode of said triode and an input terminal of said amplifier to thereby complete a feedback circuit, a potentiometer having an adjustable contactor, means for applying a source of potential across said potentiometer, means for summing the signal appearing at the cathode of said triode and the signal on the contactor of said potentiometer, and means responsive to the summed signal from said means for summing to adjust said potentiometer contactor until the summed signal is zero, means responsive to an output signal from said amplifier that said diode will not conduct for applying power to said means to adjust whereby the latter is rendered operative upon such signal occurring, and means to remove power from said means to adjust a predetermined time after said diode ceases to conduct, and means to supply said amplifier with input signals for a predetermined period of time at preselected intervals of time.

6. A circuit for providing a continuous output signal that is indicative of and in response to a discontinuous input signal that goes from a first value to a second value and back to the first value, comprising means to compare signals, a shaded-pole motor having its poles controlled by said means, a potentiometer having a contactor that is connected to an input terminal of said means to compare, means for applying a source of potential across said potentiometer, means to move said contactor responsive to the direction and amount of rotation of said shaded-pole motor, a capacitor having one plate thereof connected to another input terminal of said means to compare, first means for connecting the other plate of said capacitor to a reference potential, a diode, second means for connecting one terminal of said diode to said one plate, means for applying an input signal to the other terminal of said diode, an output signal terminal, means for connecting said output signal terminal to said contactor of said potentiometer whereby the signal appearing at said output signal terminal is a continuous signal that is indicative of and responsive to the discontinuous signal appearing at said one terminal of said diode.

7. The circuit of claim 6 wherein said second means for connecting comprises means for connecting said diode to said capacitor to provide thereto a signal of a polarity opposite to that provided by said potentiometer to said comparing means.

8. A circuit comprising a potentiometer having one end thereof connected to a source of potential; an adjustable contactor in said potentiometer; an input terminal, a rectifier, means to connect said input terminal to one side of said rectifier, a capacitor, means for connecting one plate of said capacitor to the other side of said rectifier; means to compare the signal from said potentiometer contactor with the maximum signal stored on said capacitor; first and second terminals on said means to compare; first means for connecting said potentiometer contactor to said first terminal; second means to connect said one plate of said capacitor to said second terminal; a shaded pole motor having two pole windings and a field winding; means to drive said contactor from said motor; means responsive to said means to compare to selectively deenergize one of said motor pole windings thereby to cause said motor to rotate in a direction such that said contactor is adjusted to supply a signal to said first terminal that is equal to the signal supplied to said second terminal; and means to delay the application of power to said field winding until a maximum charge has been stored on said capacitor.

9. Apparatus to provide a continuous output signal of substantially constant value that is proportional to the maximum value of a signal that is intermittently impressed on the apparatus, comprising input terminals; a direct current amplifier connected to said input terminals; a diode having an anode and cathode, the cathode being connected to an output terminal of said amplifier; a capacitor; means for connecting said capacitor to said diode anode; a potentiometer having a contactor; means for applying a source of potential across said potentiometer; an output terminal connected to said contactor; a reversible shaded-pole motor having a field coil; means for driving said contactor by said motor; a null detector having means for comparing the signal on said capacitor with the signal from the contactor of said potentiometer; means for connecting said capacitor and said contactor to respective terminals of said null detector; means responsive to said null detector means to unbalance the shaded poles of said reversible motor to thereby cause rotation thereof in one direction until the signals being compared in said null detector are equal; means for delaying the application of power to said motor field until a maximum charge has been built up on said capacitor through said diode and then for removing power from said motor field and for discharging said capacitor after the signals being compared in said null detector are equal.

10. Apparatus for providing a continuous direct current output signal that is equal to the maximum of a selected peak, where a complete cycle of events includes a series of peaks, one peak of said series being the selected peak, comprising input terminals for receiving the direct current signals as they are generated; a diode having a cathode and anode; means for connecting said cathode to said input terminals; a condenser having one side thereof grounded; a resistor having one side thereof grounded; first means for connecting the other side of said condenser to the other side of said resistor; second means for connecting the other side of said condenser to said diode anode; means for sequentially disconnecting said first means while connecting said second means and then connecting said first means while disconnecting said second means; a shaded pole motor having a drive shaft, field coil, a coil for clockwise rotation, and a coil for counterclockwise rotation; a potentiometer having a contactor and having one end connected to a source of potential; means for connecting said motor drive shaft to said contactor; and output signal terminal; a connection between said output terminal and said contactor of said potentiometer; means for comparing the signal from said contactor on said potentiometer with the signal from said other side of said condenser; means responsive to said means for comparing to actuate one of said motor coils for rotation whereby said motor rotates in one direction thereby to render said signal on said contactor equal to that on said other side of said condenser by adjusting said potentiometer contactor.

11. The apparatus of claim 10 where said means for comparing comprises a differential amplifier.

12. The apparatus of claim 10 where said means to actuate comprises a contactor, two contacts, said contactor being disposed for operation between said contacts, and means to connect said contactor to said coils for rotation.

13. The apparatus of claim 11 where said means to actuate comprises a contactor, two contacts, said contactor being disposed for operation between said contacts, and means to connect said contactor to said coils for rotation.

14. The apparatus of claim 12 wherein said means to connect comprises a transistor.

15. An analyzer system comprising a chromatographic column; means to introduce a sample of a fluid mixture to be analyzed into one end of said column; means to elute the constituents of said mixture in succession from the second end of said column; means connected to said second end of said column to establish an output direct current signal, the amplitude of which is a function of the effluent from said column; a phase reversing direct current amplifier having input and output terminals; means applying said output signal to the input terminals of said amplifier; a diode having its cathode connected to an output terminal of said amplifier; a condenser connected to the anode of said diode; a triode having its control grid connected between said condenser and said diode anode; a resistor; means connecting the cathode of said triode to one end of said resistor; means connecting the second end of said resistor to an input terminal of said amplifier to thereby complete a feedback circuit; a potentiometer having an adjustable contactor; means for summing the signal appearing at the cathode of said triode and the signal on the contactor of said potentiometer; means responsive to the summed signal from said means for summing to adjust said potentiometer contactor until the summed signal is zero; means responsive to an output signal from said amplifier of such polarity that said diode will not conduct for applying power to said means to adjust whereby the latter is rendered operative upon such an output signal occurring; and means to remove power from said means to adjust a predetermined time after said diode ceases to conduct, whereby the position of the contactor of said potentiometer is representative of the peak amplitude of said output signal.

16. An analysis system comprising a chromatographic column; means to introduce a sample of a fluid mixture to be analyzed into one end of said column; means to elute the constituents of said mixture in succession from the second end of said column; means connected to said second end of said column to establish an output direct current signal, the amplitude of which is a function of the effluent from said column; a potentiometer; means connecting a source of potential across the end terminals of said potentiometer; an input terminal; means applying said output signal to said input terminal; a rectifier; means to connect said input terminal to one side of said rectifier; a capacitor; means for connecting one plate of said capacitor to the other side of said rectifier; means to compare the signal from said potentiometer contactor with the maximum signal stored on said capacitor; first and second terminals on said means to compare; first means for connecting said potentiometer contactor to said first terminal; second means to connect said one plate of said capacitor to said second terminal; a shaded pole motor having two pole windings and a field winding; means to drive said contactor from said motor; means responsive to said means to compare to selectively deenergize one of said motor pole windings thereby to cause said motor to rotate in a direction such that said contactor is adjusted to supply a signal to said first terminal that is equal to the signal applied to said second terminal; and means to delay the application of power to said motor field until a maximum charge has been stored on said capacitor, whereby the position of the contactor of said potentiometer is representative of the peak amplitude of said output signal.

17. An analysis system comprising a chromatographic column; means to introduce a sample of a fluid mixture to be analyzed into one end of said column; means to elute the constituents of said mixture in succession from the second end of said column; means connected to said second end of said column to establish an output direct current signal, the amplitude of which is a function of the effluent from said column; input terminals; a direct current amplifier having the input thereof connected to said input terminals; means applying said output signal to said input terminals; a diode having an anode and cathode, said cathode being connected to the output of said amplifier; a capacitor; means for connecting said capacitor to said diode anode; a potentiometer having a contactor; an output terminal connected to said contactor; a reversible shaded pole motor having a field coil; means for driving said contactor by said motor; a null detector having means for comparing the signal on said capacitor with the signal from the contactor of said potentiometer; means for connecting said capacitor and said contactor to respective terminals of said null detector; means responsive to said null detector means to unbalance the shaded poles of said reversible motor to cause rotation thereof in one direction until the signals being compared by said null detector are equal; and means for delaying the application of power to said motor field until a maximum charge has been built up on said capacitor through said diode and then for removing power from said motor field and for discharging said capacitor after the signals being compared in said null detector are equal, whereby the position of the contactor of said potentiometer is representative of the peak amplitude of said output signal.

18. An analysis system comprising a chromatographic column; means to introduce a sample of a fluid mixture to be analyzed into one end of said column; means to elute the constituents of said mixture in succession from the second end of said column; means connected to said second end of said column to establish an output direct current signal, the amplitude of which is a function of the effluent from said column; input terminals; means applying said output signal to said input terminals; a diode having a cathode and anode; means for connecting said cathode to said input terminals; a condenser having one side thereof grounded; a resistor having one side thereof grounded; first means for connecting the other side of said condenser to the other side of said resistor; second means for connecting the other side of said condenser to said diode anode; means for sequentially disconnecting said first means while connecting said second means and then connecting said first means while disconnecting said second means; a shaded pole motor having a drive shaft, a field coil, a coil for clockwise rotation, and a coil for counterclockwise rotation; a potentiometer having a contactor and having one end connected to a source of potential; means for connecting said motor drive shaft to said contactor; an output signal terminal; means connecting said output terminal and said contactor of said potentiometer; means for comparing the signal from said contactor of said potentiometer with the signal from said other side of said condenser; and means responsive to said means for comparing to actuate one of the said motor coils for rotation whereby said motor rotates in one direction thereby to render said signal on said contactor equal to that on said other side of said condenser by adjusting said potentiometer contactor, whereby the position of the contactor of said potentiometer is representative of the peak amplitude of said output signal.

19. A circuit for providing a signal of reverse polarity when a maximum value of the input signal has been passed comprising a phase reversing direct current amplifier having input and output terminals, a diode, a capacitor, means connecting one terminal of said diode to an output terminal of said amplifier, means connecting the other terminal of said diode to one terminal of said capacitor, means connecting the other terminal of said capacitor to a reference potential, a triode, means connecting the control grid of said triode to a junction between said capacitor and said diode, a resistor, means for connecting one terminal of said resistor to an input terminal of said amplifier, and means for connecting the other terminal of said resistor to the output of said triode to thereby complete a negative feedback circuit for said amplifier.

20. An analysis system comprising a chromatographic column; means to introduce a sample of a fluid mixture to be analyzed into one end of said column; means to elute the constituents of said mixture in succession from the second end of said column; means connected to said second end of said column to establish an output direct current signal, the amplitude of which is a function of the effluent from said column; means to compare signals; a motor responsive to the output of said means to compare; a potentiometer; a voltage source applied across said potentiometer; means responsive to rotation of said motor to adjust the contactor of said potentiometer; means connecting the contactor of said potentiometer to a first input of said means to compare; a signal storage means; a rectifier; means for applying said output signal to the input terminal of said rectifier; means connecting the output terminal of said rectifier to an input terminal of said signal storage means; means connecting an output terminal of said signal storage means to a second input of said means to compare, whereby the position of the contactor of said potentiometer is representative of the peak amplitude of said output signal.

21. The analysis system of claim 20, further comprising timing means to discharge the signal stored in said signal storage means at selected times.

22. A circuit comprising a potentiometer having an adjustable contactor; means for connecting a first input voltage across the end terminals of said potentiometer; means for temporarily storing an input signal; an input terminal; means for applying an input signal to said input terminal; means for transferring said input signal from said input terminal to an input of said means for temporarily storing until said input signal is less than the temporarily stored input signal; means to compare said temporarily stored input signal and the voltage on said contactor; means responsive to said means to compare to adjust said contactor of said potentiometer to make the voltage on said contactor substantially equal to said temporarily stored input signal; means to connect said means to adjust to a source of power at preselected intervals of time for preselected periods of time; an output terminal; and means for connecting said output terminal to said contactor of said potentiometer.

23. The circuit of claim 22 wherein said means for transferring comprises a rectifier.

24. The circuit of claim 22 wherein said means to connect comprises a synchronous motor driving a plurality of cams, and electrical switch means having the contactors thereof driven by said cams.

References Cited in the file of this patent

UNITED STATES PATENTS

| | | |
|---|---|---|
| 2,340,880 | Keinath | Feb. 8, 1944 |
| 2,448,322 | Piety | Aug. 31, 1948 |
| 2,464,249 | McCoy | Mar. 15, 1949 |
| 2,511,671 | Jacob | June 13, 1950 |
| 2,544,922 | Greenough | Mar. 13, 1951 |
| 2,826,908 | Sharstrom | Mar. 18, 1958 |
| 2,875,606 | Robinson | Mar. 3, 1959 |
| 2,904,384 | Norem | Sept. 15, 1959 |
| 2,928,002 | Havstad | Mar. 8, 1960 |
| 2,929,928 | Hodder | Mar. 22, 1960 |

OTHER REFERENCES

Publication Articles:

(1) "Gas Chromatography" in Oil and Gas Journal, Dec. 17, 1956, page 127. (Copy in 73–23C.)

(2) "Gas Chromatography Growing" in C & EN, vol. 34, Nov. 15, Apr. 9, 1956, page 1696. (Copy in 73–23C.)